E. A. HILL.
Telegraphic Instructor.

No. 61,540. Patented Jan. 29, 1867.

Witnesses:
W. E. Mand
Jno. W. Herthel

Inventor:
E. A. Hill

United States Patent Office.

EDWARD A. HILL, OF CHICAGO, ILLINOIS.

Letters Patent No. 61,540, dated January 29, 1867.

---

IMPROVEMENT IN APPARATUS FOR INSTRUCTION IN TELEGRAPHING.

---

The Schedule referred to in these Letters Patent and making part of the same.

---

TO ALL WHOM IT MAY CONCERN:

Be it known that I, EDWARD A. HILL, of Chicago, in the county of Cook, and State of Illinois, have invented a new and useful Improvement in Apparatus for Facilitating Instruction in Telegraphing; and I do hereby declare and make known that the following is a full, clear, and exact description of the same, reference being had to the accompanying drawings, and the letters and figures marked thereon, which form part of this specification.

My invention relates to an apparatus to be used in telegraph institutes for imparting instruction in the art of telegraphing, by means of which, the lines upon which the pupils practise may be manipulated and controlled by the instructor, so as to produce all of the varying conditions of the electric current and other contingencies which arise in actual practice, thus familiarizing and exercising the pupils with and upon the same, and affording them experimental knowledge and exercise in properly adjusting their instruments, to adapt them to the said varying conditions and circumstances of actual telegraph lines. To the aforesaid ends, my invention consists in a novel arrangement for varying the strength of the electric current through the line, by passing the circuit through a greater or less number of battery cups as may be desired. My invention further consists in a novel arrangement, whereby the instructor may throw on ground wires or escapes at any desired part of the circuit or line, so as to vary the strength of the electric current in different parts of the line as may be desired. My invention further consists in a novel mode of arranging the circuit in connection with the batteries, whereby the said batteries, while arranged or placed in the centre of the line, convenient for the inspection and control of the instructor, are in effect practically at the ends of the line, as is the case in actual practice.

To enable those skilled in the art to understand how to construct and use my invention, I will proceed to describe the same with particularity, making reference in so doing to the aforesaid drawings, in which—

Similar letters of reference in the several figures denote the same parts of my invention.

Figure 1:
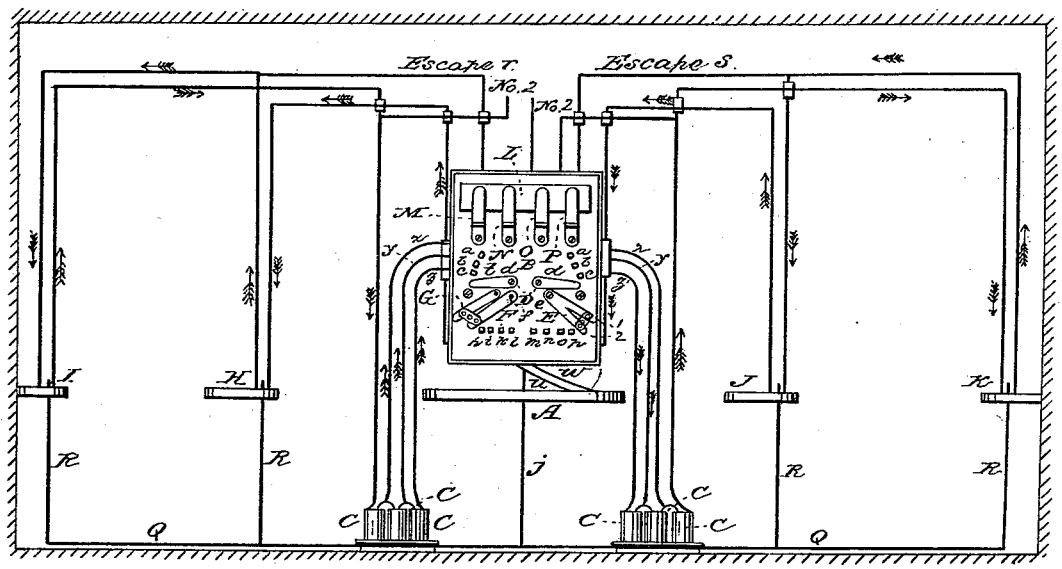
Figure 1 represents a front view or elevation of my invention.
Figure 2:
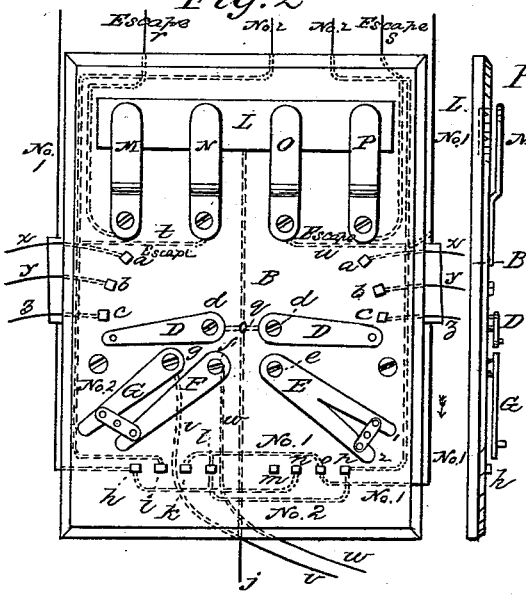
Figure 2 is an enlarged view of the operating parts thereof, showing the connections of the various lines and wires with the apparatus.
Figure 3:
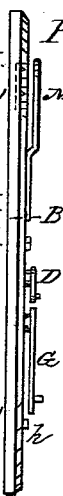
Figure 3 represents an edge or side view of the same.

A represents a desk or table at which the instructor sits, and upon which his instrument is placed, $v$ $w$ representing the wires connected therewith, which extend to the points $g$ $f$ respectively. B represents a board, upon which the operating parts of my invention are arranged, and in which the various lines and wires hereinafter mentioned have their various connections as shown. The black lines represent the lines of the circuit shown, being connected with the batteries C, as shown, and running through various offices, marked H, I, J, and K, which may be in the same room or in different rooms or buildings, as may be desired or convenient. The direction of the electric current through the line may be indicated by the arrows. D D represent movable arms, pivoted at $d$, being connected by a wire, $q$, as shown, the ends of which may be adjusted at will, upon either of the points $a$ $b$ $c$, which form the termini of the lines or wires $x$ $y$ $z$, respectively, as indicated. Thus it is obvious that by placing the arms upon the points $a$ $a$, the circuit passes through only two cups of the batteries, or one cup in each battery, while by arranging said arms upon the points $b$ $b$, the circuit passes through four cups, and by arranging them upon the points $c$ $c$, the circuit passes through six cups, and so on to any extent as may be desired. By this arrangement of the two batteries and the wires $x$ $y$ $z$ with the apparatus, the instructor can readily strengthen or weaken the electric current, thus requiring the pupils to adjust their instruments to adapt them to said variations, and affording them practical experience in relation to such adjustments. $E^1$ $E^2$ represent a forked arm, pivoted at $e$, so as to be adjusted upon the points $m$ $n$ $o$ $p$ when desired. F G represent two movable arms, pivoted respectively at $f$ $g$, so as to be moved or adjusted upon the points $h$ $i$ $k$ $l$, when desired. When $E^1$ is arranged upon the point $o$, and $E^2$ upon the point $m$, and the arm F is arranged upon $k$, and the arm G upon $h$, line No. 1 is then brought in connection with the instructor's instrument through the wires $v$ $w$, as shown. But by arranging the arm $E^1$ upon $p$, $E^2$ upon $n$, the arm F upon $l$, and G upon $i$, the line No. 2, indicated by blue lines in the drawings, is brought in connection with the instructor's instrument through said wires $v$ $w$. Thus by a simple and ready adjustment of said arms E F G, the instructor may communicate with offices upon either of the two separate lines at pleasure; or by arranging either of the arms E F G so as to come in contact with adjacent points in the different lines at the same time, what is technically called a "cross" is produced. L represents a metallic plate, arranged upon the board B, which is connected with the ground by the wire $j$, passing through or connected with the circuit at $q$, and connected with the ground, or wire representing the ground, marked Q, as shown. R represents the ground wires, connecting the several offices with the wire Q. M N O P represent a series of metallic bars attached to the board C at one end, while the opposite ends lie over said plate L, leaving a space between, as is shown in fig. 3. To the lower ends of said bars are connected a series of escape wires, $r\ s\ t\ u$; $r$ being connected with the circuit at a point between the offices H I; $s$ between the offices J K; $t$ between the instructor's instrument and office H; and $u$ between the instructor's instrument and the office J. For a greater number of escapes, a correspondingly greater number of bars, M, must be used. To throw on an escape the instructor places a wedge of charcoal or some other partial conductor between the plate L and the appropriate arm. Thus, to throw on an escape between H and I, a charcoal wedge or block is inserted between said plate and the arm M; to throw on an escape between the instructor and the office H, he places the charcoal or other suitable medium between the plate L and arm N, and so on. Or by inserting a metallic wedge between said parts, ground wires or total escapes may be effected at the points desired. The object of this arrangement would obviously be attained equally as well by making the plate L in sections or parts corresponding in number with the arms M N O P, each part being connected with the ground wire by a separate wire. When the offices at the end of the circuit are in different rooms or buildings, it would be sufficient that the various escape wires should be brought into the instructor's room whether brought directly to his desk or not, for in either case he could readily control and operate the escapes as desired. Hence the plate L, or its detached parts and the corresponding terminal arms of the escapes, in such cases may be arranged upon the board B or not as may be preferred, it being sufficient that said escapes are arranged so as to be controlled by the instructor in his central office or apartment.

Having described the construction and operation of my invention, I will now specify what I claim, and desire to secure by Letters Patent:

1. I claim the combination of the two batteries C C, with a series of wires $x\ y\ z$, and their terminal points $a\ b\ c$, and the movable arms D D connected with a wire $q$, or its equivalent, arranged and operating substantially as herein specified and shown.

2. I claim the employment of a series of escape wires $r\ s\ t\ u$, and their terminal arms M N O P, in combination with a plate or plates L, connected with a ground wire Q, arranged and operating substantially as herein shown and described.

3. I claim the arrangement of the two terminal batteries C C, with the circuit through the same, so as to be placed at the centre of the line upon each side of the instructor's desk, substantially as and for the purposes shown and set forth.

E. A. HILL.

Witnesses:
   W. E. MARRS,
   J. W. HERTHEL.